United States Patent Office 2,739,169
Patented Mar. 20, 1956

2,739,169

MANUFACTURE OF CARBOXYL COMPOUNDS

Hugh J. Hagemeyer, Jr., Kingsport, Tenn., assignor to Eastman Kodak Company, Rochester, N. Y., a corporation of New Jersey No Drawing. Original application April 22, 1948, Serial No. 22,714, now Patent No. 2,593,440, dated April 22, 1952. Divided and this application March 25, 1952, Serial No. 278,475

1 Claim. (Cl. 260—540)

This invention relates to the production of organic acids and anhydrides. More particularly this invention concerns the reaction of organic compounds such as olefins, alcohols, ethers, and esters with carbon monoxide and steam in the presence of a special type of catalyst for obtaining lower aliphatic acids and/or anhydrides.

The prior art is replete with descriptions of processes concerning the reaction of various organic compounds such as olefins, alcohols, ethers, and esters and the like with carbon monoxide and steam. The prior art describes the use of various and numerous different types of catalysts whereby the addition of a carbon atom to the organic compounds of the type indicated is caused to take place with the resultant formation of a carboxyl compound, such as an acid. In further detail there are numerous prior art descriptions outstanding respecting the reaction of ethylene, propylene, and the like with carbon monoxide and steam, these reactions being described as carried out in the presence of many varieties of catalysts ranging from charcoal on the one hand to inorganic acids on the other. These descriptions indicate that such reactions give propionic acid or similar carboxyl compound.

While from these numerous disclosures in the prior art it is apparent that a carbon atom may be added to various sources of other carbon atoms for obtaining carboxyl compounds, as far as I am aware the yields of reaction products and certain other aspects have not been favorable. Some of these prior art disclosures do not even set forth the yield of carboxyl compound. Or in checking the described prior art process with the prior art catalyst it has been found that only low yields are obtained in the reaction and other disadvantages encountered. It appears that the prior art approach to the specification of a catalyst for reactions of the class indicated has been somewhat empirical and random. Consequently, processes in which substantial yields are obtained and in which reasonably sustained operation may be accomplished do not appear to have been described in the prior art.

I have found that reactions of the class indicated, wherein an organic compound is reacted with CO and a source of H₂O, may be carried out in a much improved manner with better yields and other advantages by utilizing the particular types of catalysts and other conditions set forth in detail hereinafter.

This invention has for one object to provide a process for the reaction of various organic compounds of the class indicated with a source of CO and H₂O for the obtaining of carboxyl compounds such as acids and anhydrides. Another object is to provide an improved method and catalyst particularly applicable to the reaction of olefins with CO and H₂O. Still a further object is to provide a method and catalyst particularly useful in the reaction of ethers, esters, and alcohols, with CO and H₂O. Another object is to provide a process and catalyst for the class of reaction indicated wherein reasonably high yields of reaction product may be obtained. Another object is to provide a process of the class indicated which is capable of reasonably sustained and continuous operation. Other objects will appear hereinafter.

I have found that reaction of an organic compound with a source of CO and H₂O may be enhanced and reasonably sustained operation accomplished by the carrying out of the reaction in the presence of a special catalyst comprising compounds capable of forming metal carbonyls and combinations thereof, as will be set forth in detail hereinafter. As will also be indicated, the special catalysts employed in the method of the present invention act as carbon monoxide transfer agents and can be recovered, recycled, and regenerated in a continuous process. The use of the metal carbonyl type of catalyst is particularly advantageous in that they permit a reasonable reaction rate which makes the process commercially practicable. Yields of 85–90% of the desired carboxylic acid or anhydride can be obtained with substantially no loss in catalyst materials.

A further understanding of my invention will be had from the following general description. Aliphatic carboxylic acids can be obtained in 90% yields by the reaction of olefins, carbon monoxide and steam in the presence of metal carbonyl catalysts at elevated temperatures and pressures.

$$R_2C=CR_2 + CO + H_2O \rightarrow CHR_2CR_2COOH$$

where R is hydrogen, alkyl, or aryl. In addition to the acid a smaller amount of the corresponding alcohol is also formed in many cases.

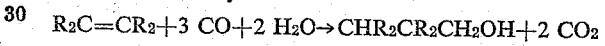

$$R_2C=CR_2 + 3\ CO + 2\ H_2O \rightarrow CHR_2CR_2CH_2OH + 2\ CO_2$$

If an anhydride is the desired product an organic carboxylic acid is substituted for the steam. With ethylene, carbon monoxide and propionic acid the reaction can be represented as follows:

$$CH_2=CH_2 + CO + CH_3CH_2COOH \rightarrow (CH_3CH_2CO)_2O$$

Olefins which can be used in this reaction include ethylene, propylene, butylene, isobutylene, 2-ethyl hexene-1, styrene, cyclohexane, and higher olefins. Diolefins such as butadiene and piperylene can also be reacted to form dicarboxylic acids.

This reaction of carbon monoxide with olefins and steam or carboxylic acids is carried out in the presence of a metal carbonyl catalyst. The metal carbonyl is conveniently formed in situ and in a continuous process the metal carbonyl can be recycled with a minimum of catalyst loss. Typical of the carbonyl-forming materials which may be used are the halides, cyanides, sulfides, selenides and organic thioacids of Ni, Co, Fe, Cr, Mo, Ru, Pd, Pt, Re, Os, and Ir. In general the halides, sulfides and organic thioacids of nickel, cobalt and iron are preferred as the carbonyl-forming materials.

The carbonyl formation and the rate of reaction is considerably accelerated by the presence of an acceptor metal to combine with the negative ion or radical of the carbonyl-forming metal salt, e. g., with nickel chloride and powdered copper the reaction can be represented as follows:

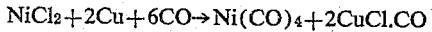

$$NiCl_2 + 2Cu + 6CO \rightarrow Ni(CO)_4 + 2CuCl\cdot CO$$

Suitable acceptor metals include nickel, cobalt, iron, silver, copper, cadminum and zinc or the lower aliphatic carboxylic acid salts of these metals. The presence of an acceptor metal is essential to maintain an efficient transfer catalyst which requires that a catalyst remain in a transitory rather than static state.

The preferred catalyst composition contains in addition to the carbonyl-forming metal salt and the acceptor metal, a third component which acts merely as a promoter. Promoters include the alkali metal salts of the halogens, sulfur, and selenium; halogens; zinc chloride, alkyl halides; o-phosphoric acid and trialkyl phosphates;

boric acid and boron triphosphate; carbonyl sulfide, carbon disulfide, and sulfur dioxide. The catalyst used in this process is then a three component catalyst consisting of (1) a carbonyl-forming metal salt, (2) an acceptor metal, and (3) a promoter. A catalyst containing sulfur or selenium in an active state, e. g., NiS, CoS, Na₂S has a particular advantage, since the sulfur or selenium acts to offset the negative effect caused by traces of oxygen in the reaction system.

In carrying out the reaction with a carbonyl-forming metal salt and in the presence of a promoter the reactor wall can function as the acceptor metal. This is particularly true wherein the reactor is lined with silver, copper or nickel.

While the above description has been with respect to the reaction of an olefinic type of compound, it will be kept in mind that the process of the present invention may also be applied to other organic compounds such as ethers, esters, and alcohols reacted with sources of CO and H₂O, as will be apparent from the details set forth hereinafter. However, before proceeding to a description of these other species of reaction, further details are now set forth regarding the reaction of the olefin type of compound.

The reaction of olefins with carbon monoxide and steam or carboxylic acids requires the use of high temperatures and pressures. In general temperatures of 200–400° C. are used at 40–700 atmospheres. A sharp increase in reaction velocity occurs at 300–320° C. and 5000 p. s. i. Catalysts concentrations of 2–10% are sufficient and usually 2–4% is preferred. Higher concentrations may be used but there is no advantage in doing so.

The catalyst can be selected from any of the members of the three groups described above. The catalyst composition, i. e., the molar ratio of carbonyl forming metal salt/acceptor metal-promoter can be varied to suit the individual. However, I have found that molar ratios of 1/1/1, 2/1/2, and 3/2/1 give high yields with a fast rate of reaction.

Iodides and sulfides show the maximum catalyst activity. Typical catalyst compositions which may be used include: nickel sulfide, Raney nickel, sodium iodide; nickel chloride, nickel acetate, sodium iodide; cobalt sulfide, Raney nickel, sodium bromide; nickel iodide, zinc dust, iodine; nickel xanthogenate, sodium iodide, Raney nickel; and nickel thiophenolate, sodium iodide, nickel propionate; cobalt carbonyl, ethyl iodide, cobaltous acetate; iron carbonyl, sodium iodide, cobaltous acetate; cobaltous chloride, ethyl bromide, copper acetate; and nickel carbonyl, ethyl iodide, nickel acetate. In a copper or silver lined reactor typical catalyst compositions which may be used include: nickel carbonyl, ethyl iodide; cobalt carbonyl and/or dimer, sodium iodide; iron carbonyl, zinc chloride; nickel hexamine chloride, iodine; and cobalt iodide, boron triphosphate.

In a continuous process using iron or nickel carbonyl forming salts as the catalyst, the carbonyl is recovered as by distillation and returned to the reaction. The catalyst residues from the base heaters of the product still can also be recycled. With cobalt carbonyl-forming salts it has been found that the residue from the product stills can be recycled as the active catalyst.

Carbon monoxide can be generated from carbon dioxide and coke. Water gas is also suitable as a source of carbon monoxide for this reaction and an off gas rich in hydrogen is obtained.

*Example I*

Nine grams of nickel hexamine chloride, eight grams of sodium iodide, six grams of Raney nickel and 230 grams of water were charged to a rocking autoclave. The autoclave was swept out with carbon monoxide and charged with 3 mols. of carbon monoxide and 2 mols. of ethylene. The pressure used varied between 3700–5100 p. s. i. at 280–320° C. and the reaction was complete in 93 minutes. Distillation of the reaction product gave 11 grams of nickel carbonyl and after drying 132 grams of propionic acid.

*Example II*

Five grams of nickel iodide, five grams of sodium iodide, five grams of nickel butyrate and 300 grams of water were charged to a copper lined rocking autoclave. Propylene and carbon monoxide were added in a 1:4 ratio at 320° C. and 4400–4700 p. s. i. The reaction was complete in 31 minutes for one mole. of propylene. Distillation gave in addition to nickel carbonyl an 87% yield of isobutyric and n-butyric acids.

*Example III*

To an autoclave containing four per cent catalyst concentration of a 1/1/1 mixture of nickel chloride hexahydrate, sodium iodide and nickel acetate in 300 grams of water was added ethylene and carbon monoxide in a 1:1 ratio. The reaction temperature was 280–300° C. and the pressure was held between 3000–3600 p. s. i. The overall conversion was 82% and a 93% yield of propionic acid and a 7% yield of n-propyl alcohol based on the ethylene consumed were obtained in addition to 7.6 grams of nickel carbonyl.

*Example IV*

Five grams of nickel iodide, five grams of sodium iodide, and five grams of Raney nickel with 222 grams of propionic acid are charged to a copper lined autoclave. Ethylene and carbon monoxide are added in a 1:1 ratio at 300–320° C. and 4500–5200 p. s. i. The time per gram mole. was 36 minutes. Distillation of the products gave eight grams of nickel carbonyl and 300 grams of propionic anhydride in addition to unchanged propionic acid.

*Example V*

To a copper lined autoclave containing four per cent of a 1/1/1 mixture of nickel carbonyl, ethyl iodide and nickel propionate in propionic acid was added ethylene and carbon monoxide in a 1/1 ratio. The reaction temperature was 330–350° C. and the pressure was maintained between 4200–6000 p. s. i. A 58% conversion to propionic anhydride was obtained.

*Example VI*

Cobalt chloride, sodium iodide and nickel acetate in a 1/1/1 ratio and in a concentration of 5% in water were charged to a copper lined autoclave. Ethylene and carbon monoxide were pressed in at 350° C. and 5600–6300 p. s. i. A 73% conversion to propionic acid was obtained.

*Example VII*

Ten grams of iron carbonyl, 5 grams of ethyl iodide and 200 grams of water were charged to a copper lined autoclave. Five grams moles of ethylene and carbon monoxide respectively were reacted at 340–360° C. and 5800–6100 p. s. i. 195 grams of propionic acid were obtained.

Referring now to the reaction of the present invention, wherein an ether or an ester is employed in place of an olefin as a feed material, it will be noted that the same catalyst and the same conditions of pressure, temperature and the like may also be utilized. However, for completeness of description, further details with respect thereto will be apparent from the following:

Aliphatic and cycloaliphatic ethers and esters can be reacted with carbon monoxide and steam to form the corresponding aliphatic carboxylic acids. With aliphatic ethers the reaction can be written as follows:

where R is methyl, ethyl, isopropyl, propyl, butyl, isobutyl, etc. In the absence of water ethers and carbon monoxide react to form an ester as the principal product.

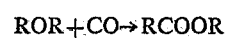

When esters are reacted with carbon monoxide in the presence of steam, hydrolysis takes place and the hydrolyzable alkoxy group reacts with the carbon monoxide to form an additional equivalent of an aliphatic carboxylic acid.

$$RCOOR + H_2O + CO \rightarrow 2RCOOH$$

Typical esters which may be used include: methyl acetate, ethyl acetate, ethyl propionate, ethyl butyrate, propyl propionate, etc.

*Example VIII*

280 grams of diethyl ether, 72 grams of water, 10 grams of nickel chloride hexahydrate, 4 grams of sodium iodide, and 5 grams of Raney nickel were charged to a copper lined rocking autoclave. The autoclave was charged with carbon monoxide and the reaction was conducted at 270–300° C. at 3600–5150 p. s. i. Distillation of the reaction product gave 6 grams of nickel carbonyl, 123 grams of ethyl propionate and 190 grams of propionic acid in addition to some unchanged ether.

*Example IX*

277 grams of ethyl acetate, 96 grams of water, 6 grams of nickel iodide, 5 grams of sodium iodide, and 5 grams of Raney nickel are charged to an 800 cc. copper lined autoclave. The autoclave was swept out with carbon monoxide and charged at 3900–4300 p. s. i. at 320–340°. The reaction time was 23 minutes per gram mole. Distillation gave 7 grams of nickel carbonyl, 94.7 grams of acetic acid, 108 grams of propionic acid and some unchanged ethyl acetate.

*Example X*

370 grams of diethyl ether, 90 grams of water, 5 grams of ethyl iodide, 15 grams of nickel iodide, and 5 grams of nickel acetate are charged to the autoclave. Carbon monoxide was added at 4400–5700 p. s. i. and 320–340° C. The time per gram mole. was approximately 16 minutes. Distillation showed an 81% conversion to propionic acid. Nickel carbonyl and unchanged diethyl ether were the only other materials present in addition to 8 grams of catalyst residue.

*Example XI*

288 grams of tetrahydrofuran, 100 grams of water, 5 grams of isopropyl iodide, 15 grams of nickel sulfide, and 5 grams of Raney nickel are charged to the copper lined autoclave. Carbon monoxide was charged to the autoclave at 4700–5600 p. s. i. and the reactor was heated at 330–350° C. A 64% yield of adipic acid was obtained.

Referring now to the species of reaction, wherein a hydroxy compound, such as a lower aliphatic alcohol, is employed as the feed material in place of an olefin, ether, or an ester, it will be noted that here again the same type of catalyst, temperature and pressure conditions may be employed. Hence, general description of such information is not repeated, but description is directed to specific examples illustrating this aspect of my invention.

Aliphatic carboxylic acids can be obtained in 95% yields by the reaction of carbon monoxide with aliphatic alcohols in the presence of water. At high temperatures and pressures aliphatic alcohols exist in equilibrium with the corresponding ether:

$$2ROH \rightleftharpoons ROR + H_2O$$

If the ester is the desired product, the reaction is carried out in the absence of water. With carbon monoxide methanol forms methyl acetate: ethanol, ethyl propionate; propanol, propyl butyrate; etc., in addition to some free acid. In order to prevent the formation of esters water should be added in at least a one to two molar ratio with the alcohol. The alcohol-carbon monoxide reaction may be expressed as follows:

$$3C_NH_{(2N+1)}OH + 2CO \rightarrow$$
$$C_NH_{(2N+1)}COOH + C_NH_{(2N+1)}$$
$$COOC_NH_{(2N+1)} + H_2O$$

In the presence of sufficient water the free acid is formed in 95% yields.

$$2C_NH_{2N+1}OH + 2CO + H_2O \rightarrow 2C_NH_{2N+1}COOH + H_2O$$

In addition to monohydric alcohols, dihydric and polyhydric alcohols can be reacted with carbon monoxide by the process of the present invention to form dicarboxylic and polycarboxylic acids.

*Example XII*

230 grams of ethyl alcohol and 10 grams of $$NiCl_2 \times 6H_2O$$

4 grams of sodium iodide with five grams of Raney nickel in 45 grams of distilled water were charged to an 800 ml. copper lined autoclave. The reactor was swept out with carbon monoxide and charged to 5000 p. s. i. at 300–320° C. A rapid reaction took place and the theoretical amount of carbon monoxide was reacted in two hours. The contents of the autoclave were blown out, condensed and distilled. In addition to seven grams of nickel carbonyl and 60 grams of ethyl propionate, 263 grams of propionic acid were isolated.

*Example XIII*

230 grams of ethyl alcohol, seven grams of nickel iodide, four grams of sodium iodide and five grams of nickel acetate together with 90 grams of water were charged to the copper lined autoclave. The reactor was swept out with carbon monoxide and charged to 4200 p. s. i. at 280° C. The pressure ranged between 3400–4800 p. s. i. at temperatures of 260–290° C. The reaction was complete in 1.5 hours. Distillation gave 6.5 grams of nickel carbonyl, 23 grams of ethyl propionate, and 302 grams of propionic acid.

*Example XIV*

230 grams of ethyl alcohol, eight grams of nickel sulfide, four grams of sodium iodide, four grams of powdered zinc dust and 45 grams of water were charged to the autoclave. The conditions used were 300–320° C. at 4500–5500 p. s. i. The theoretical amount of carbon monoxide was taken up in two hours. 274 grams of propionic acid were obtained in addition to the usual small amount of nickel carbonyl and some ethyl propionate.

*Example XV*

320 grams of methyl alcohol, and 10 grams of NiCl₂ × 6 H₂O, four grams of sodium iodide with five grams of Raney nickel were charged to the autoclave. The reactor was heated to 320° C. at 4400–5200 p. s. i. and was stopped at the end of three hours. Distillation gave eight grams of nickel carbonyl, 127 grams of methyl acetate and 212 grams of acetic acid in addition to unchanged methanol.

*Example XVI*

300 grams of isopropyl alcohol, 90 grams of water, seven grams of cobalt sulfide, four grams of sodium iodide, and five grams of Raney nickel were charged to the 800 ml. copper lined rocking autoclave. The autoclave was swept out with carbon monoxide and charged to 5500 p. s. i. at 320°. The theoretical amount of carbon monoxide was charged to the autoclave over a three hour period. Distillation of the reaction product gave 42 grams of isopropyl isobutyrate and 300 grams of isobutyric acid.

Example XVII 370 grams of normal butyl alcohol and 20 grams of nickel iodide, 12 grams of sodium iodide, and 10 grams of Raney nickel with 45 grams of distilled water were charged to a copper lined autoclave. The reactor was swept out with carbon monoxide and charged 4900–5400 p. s. i. at 330–340° C. Carbon monoxide was pressed in continuously over a two hour period. The contents of the autoclave were blown off, condensed and distilled. In addition to nickel carbonyl, unchanged butyl alcohol and butyl valerate a 48% conversion to normal valeric acid was obtained.

Example XVIII 230 grams of ethanol, 45 grams of distilled water, 8 grams of nickel iodide and 2 grams of ethyl iodide were charged to a copper lined autoclave. Carbon monoxide was pressed in at 335–350° C. and 4700–5800 p. s. i. Distillation of the reaction products gave 249 grams of propionic acid.

Example XIX 160 grams of methanol, 45 grams of distilled water, 10 grams of nickel iodide, 4 grams of sodium iodide, 6 grams of nickel acetate were charged to a copper lined autoclave. Carbon monoxide was added continuously and reaction was carried out at temperatures between 270–340° C. and at pressures up to 5800 p. s. i. Distillation gave 52 grams of unchanged methanol and 142 grams of acetic acid.

It may be seen from the above that I have provided an improved process for the reaction of CO and $H_2O$ with a source of carbon atoms such as olefins, ethers, esters, alcohols and the like for obtaining a carboxyl compound such as an acid. As discussed, at the temperatures and pressures prevailing, whether the source of carbon atoms be an ester, ether, or the like, there may be rearrangement to the particular compound that combined with the CO and $H_2O$. However, since my ternary type catalyst functions in all instances whatever the feed, whether esters, ethers, alcohols, etc., or mixtures thereof, it is not desired to be bound by any particular theory of mechanism of reaction.

This application is a division of my copending application Serial No. 22,714, filed April 22, 1948, now Patent 2,593,440.

I claim:

A catalytic process for the preparation of propionic acid which comprises reacting diethyl ether, water and carbon monoxide, said reaction being carried out in the presence of an amount of a three-component catalyst, the weight of which three-component catalyst does not exceed 20% of the weight of the propionic acid produced, the reaction being carried out at a temperature between 150° C. and 400° C. and at a pressure between 40 atmospheres and 700 atmospheres, the characterizing features of the reaction comprising conducting the reaction in the presence of a three-component catalyst generated from a three-component mixture which comprises nickel chloride hexahydrate, copper and sodium iodide.

References Cited in the file of this patent

UNITED STATES PATENTS

| Number | Name | Date |
|---|---|---|
| 1,924,763 | Carpenter | Aug. 29, 1933 |
| 1,924,767 | Carpenter | Aug. 29, 1933 |
| 1,973,662 | Schalch | Sept. 11, 1934 |
| 2,437,600 | Gresham et al. | Mar. 9, 1948 |
| 2,448,368 | Gresham et al. | Aug. 31, 1948 |
| 2,448,375 | Larson | Aug. 31, 1948 |
| 2,457,204 | Brooks | Dec. 28, 1948 |
| 2,462,738 | Gresham | Feb. 22, 1949 |
| 2,473,993 | Gresham et al. | June 21, 1949 |
| 2,497,304 | Gresham et al. | Feb. 14, 1950 |
| 2,510,105 | Hedberg | June 6, 1950 |
| 2,549,435 | Gresham et al. | Apr. 17, 1951 |
| 2,549,455 | Gresham et al. | Apr. 17, 1951 |
| 2,593,440 | Hagemeyer | Apr. 22, 1952 |

OTHER REFERENCES

Reppe: "Acetylene Chemistry," P. B. Report, 18852, S (Chas. A. Meyer & Co., Inc.) pgs. 161–177 (1949).